(12) United States Patent
Rayaprolu et al.

(10) Patent No.: US 11,175,979 B2
(45) Date of Patent: Nov. 16, 2021

(54) PRIORITIZATION OF ERROR CONTROL OPERATIONS AT A MEMORY SUB-SYSTEM

(71) Applicant: MICRON TECHNOLOGY, INC., Boise, ID (US)

(72) Inventors: Vamsi Pavan Rayaprolu, San Jose, CA (US); Harish R. Singidi, Fremont, CA (US); Kishore Kumar Muchherla, Fremont, CA (US); Ashutosh Malshe, Fremont, CA (US); Xiangang Luo, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 79 days.

(21) Appl. No.: 16/533,328

(22) Filed: Aug. 6, 2019

(65) Prior Publication Data
US 2021/0042181 A1    Feb. 11, 2021

(51) Int. Cl.
*G06F 11/07* (2006.01)

(52) U.S. Cl.
CPC ...... *G06F 11/0793* (2013.01); *G06F 11/0727* (2013.01); *G06F 11/0751* (2013.01)

(58) Field of Classification Search
CPC ............ G06F 11/0793; G06F 11/0727; G06F 11/0751
USPC .......................................................... 714/15
See application file for complete search history.

(56) References Cited

U.S. PATENT DOCUMENTS

| | | | |
|---|---|---|---|
| 2010/0083029 A1* | 4/2010 | Erickson | G06F 11/0709 714/2 |
| 2020/0210272 A1* | 7/2020 | Zhang | G06F 12/08 |

\* cited by examiner

*Primary Examiner* — Yair Leibovich
(74) *Attorney, Agent, or Firm* — Lowenstein Sandler LLP

(57) ABSTRACT

A memory access operation can be determined to have failed. A determination can be made as to whether a performance of a first error control operation has remedied the failure of the memory access operation. In response to determining that the first error control operation has remedied the failure of the memory access operation, an order of a performance of one or more prioritized error control operations of the plurality of prioritized error control operations can be changed for a subsequent memory access operation that has failed based on the first error control operation that has remedied the failure.

20 Claims, 9 Drawing Sheets

| 320 | | | | | |
|---|---|---|---|---|---|
| | ERROR CONTROL OPERATION 1 | ERROR CONTROL OPERATION 4 | ERROR CONTROL OPERATION 7 | ERROR CONTROL OPERATION 5 | ERROR CONTROL OPERATION 2 |
| 340 | 50 | 15 | 30 | 0 | 5 |

330 (pointing to ERROR CONTROL OPERATION 7 column)

| 320 | | | | | |
|---|---|---|---|---|---|
| | ERROR CONTROL OPERATION 1 | ERROR CONTROL OPERATION 7 | ERROR CONTROL OPERATION 4 | ERROR CONTROL OPERATION 5 | ERROR CONTROL OPERATION 2 |
| 340 | 50 | 30 | 15 | 0 | 5 |

330 (pointing to ERROR CONTROL OPERATION 7 column)

FIG. 3B

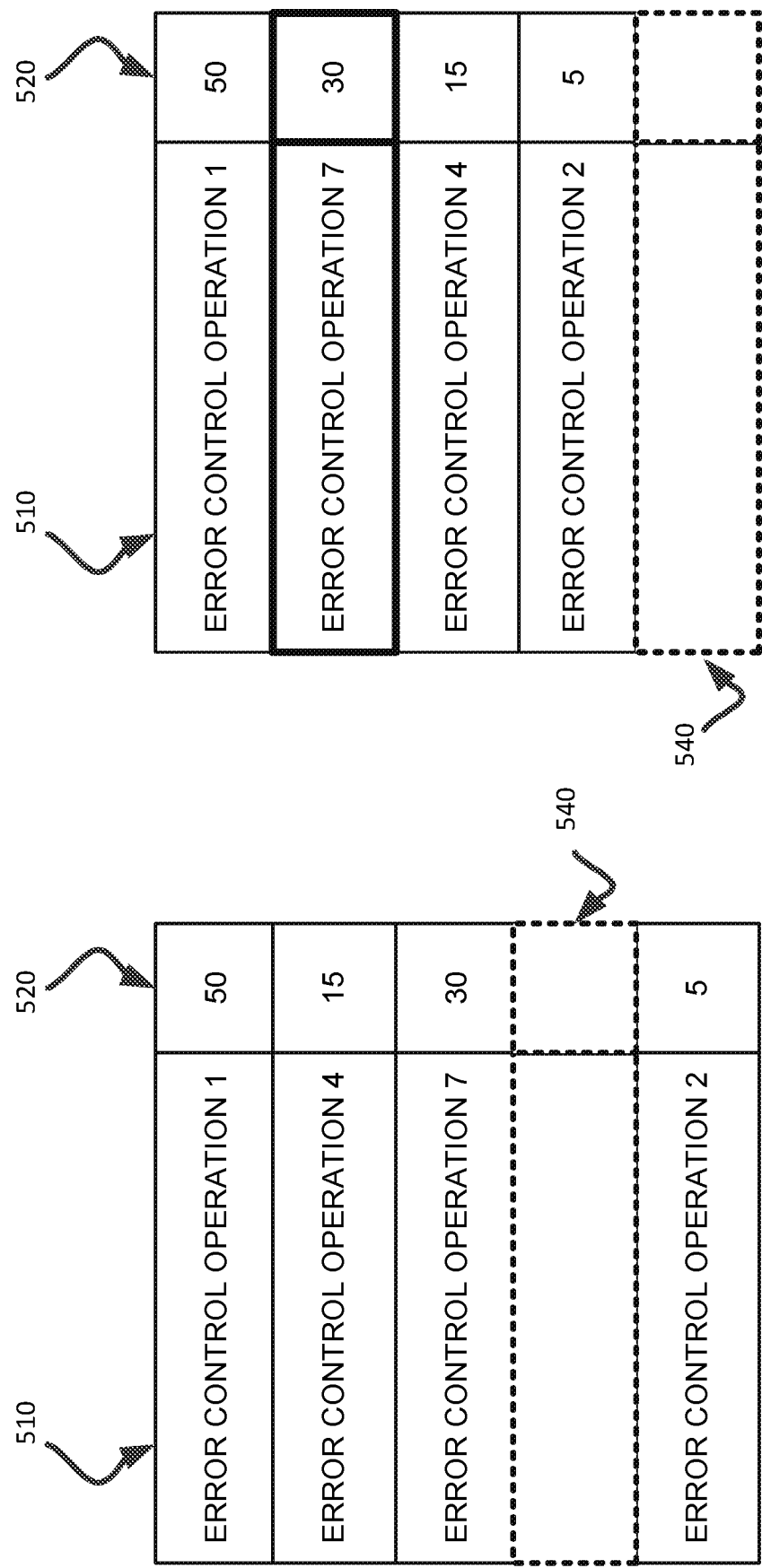

PRIORITIZATION OF ERROR CONTROL OPERATIONS AT A MEMORY SUB-SYSTEM

TECHNICAL FIELD

Embodiments of the disclosure relate generally to memory sub-systems, and more specifically, relate to prioritization of error control operations at a memory sub-system.

BACKGROUND

A memory sub-system can be a storage device, a memory module, and a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3B illustrates a changing of an order of performance of an example set of prioritized error control operations, in accordance with some embodiments of the present disclosure.

FIG. 5C illustrates a removing of a prioritized error control operation from an example set of prioritized error control operations, in accordance with some embodiments of the present disclosure.

FIG. 5D illustrates a removing of a prioritized error control operation and a changing of an order of performance of an example set of prioritized error control operations, in accordance with some embodiments of the present disclosure.

DETAILED DESCRIPTION

Figure 1:
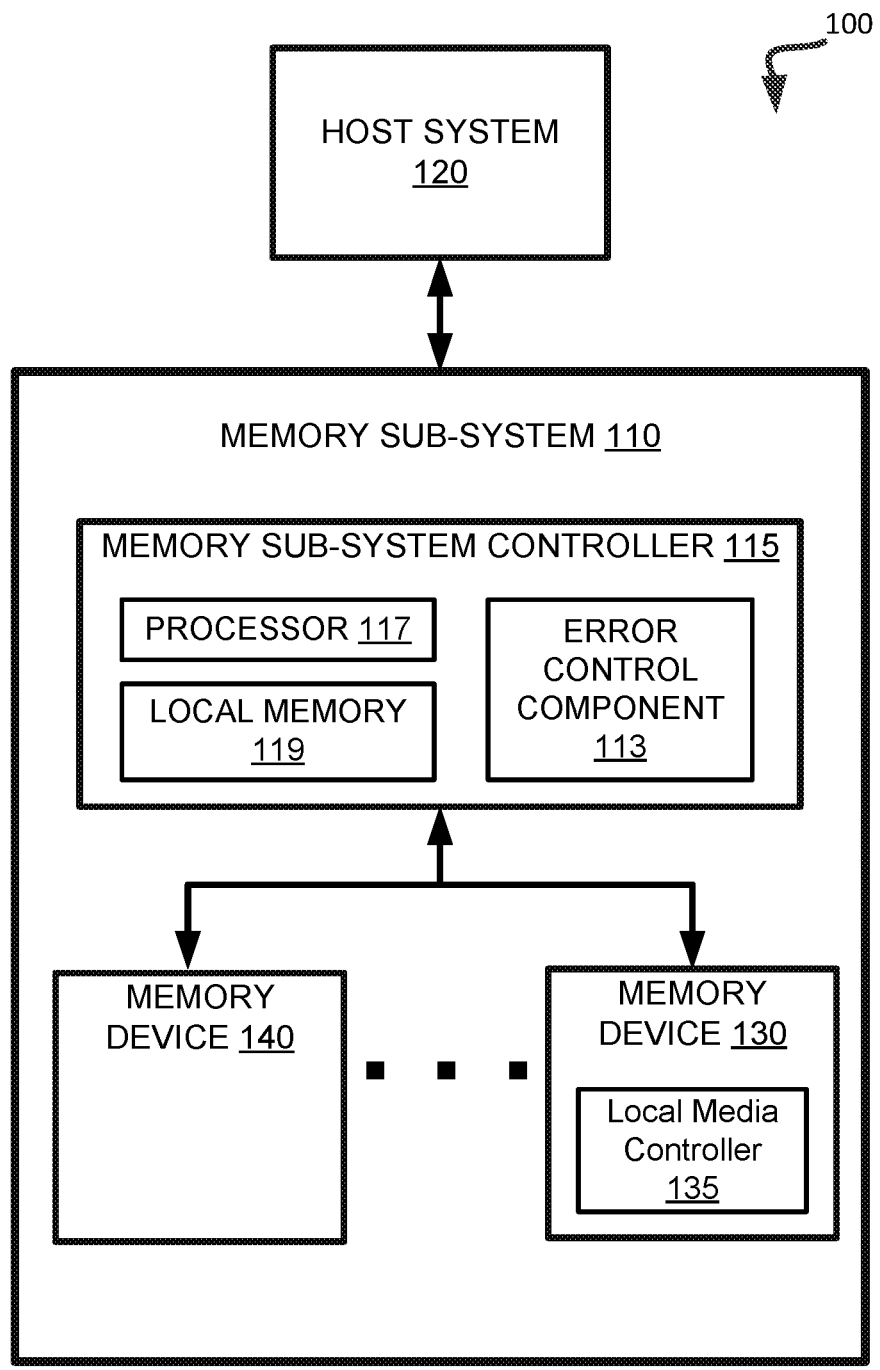
FIG. 1 illustrates an example computing environment that includes a memory sub-system in accordance with some embodiments of the present disclosure.

Aspects of the present disclosure are directed to the prioritization of error control operations at a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A conventional memory sub-system can perform various operations with respect to one or more memory components included in the memory sub-system. For example, read operations, program (i.e., write) operations, and erase operations can be performed at one or more memory components. In a conventional memory sub-system, a failure can occur while performing one of these various operations. For example, a failure can occur during a read operation performed at one or more memory components. A failure can occur as a result of an error in retrieving data that can result in one or more values of bits of the data to be changed from a '0' to a '1' (or vice versa) during the performance of a read operation. The memory sub-system can detect that the read operation failed and can remedy the failure by executing one or more error control operations identified from a selection of available error control operations. The error control operation that successfully remedied the failed read operation can be recorded to an error control data structure. Multiple error control operations can be recorded to the error control data structure as different error control operations are used to remedy subsequent failed read operations. When a subsequent read operation failure is detected, the memory sub-system can execute one or more previously successful error control operations identified from the error control data structure to remedy the subsequent failure before executing another available error control operation that is not included on the error control data structure.

Although the error control operations recorded to the error control data structure have successfully remedied at least one previous read operation failure, the error control operations specified in the error control data structure may not efficiently remedy subsequent read operation failures. For example, if a previously successful error control operation is selected from the error control data structure to remedy a read operation failure, but the successful error control operation has not successfully remedied any subsequent read operation failures, the read operation can be delayed until the memory sub-system can identify a different error control operation that can successfully remedy the failed read operation. In another example, the memory sub-system can identify and execute an error control operation from the error control data structure since the executed error control operation successfully remedied the most recent read operation failure. However, the identified error control operation may not successfully remedy any subsequent read operation failures, and therefore, the read operation can be delayed until the memory sub-system can identify a different error control operation that can successfully remedy the failed operation. Delays in the performance of a read operation caused by the above described examples can result in additional read latency for the conventional memory sub-system.

Aspects of the present disclosure address the above and other deficiencies by dynamically maintaining a set of prioritized error control operations for remedying read operation failures. For example, an error control operation can successfully remedy a read operation failure. The successful error control operation can be identified as a prioritized error control operation, where all prioritized error control operations are executed by the memory sub-system before non-prioritized error control operations. As more prioritized error control operations are identified, the memory sub-system can organize an order in which the prioritized error control operations are executed to remedy read operation failures so that the more successful prioritized error control operations are executed before the less successful prioritized error control operations. For example, the memory sub-system can reorder the execution of the prioritized error control operations so that the more successful prioritized error control operations are executed before the less successful prioritized error control operations. In another example, the memory sub-system can remove an identification of a prioritized error control operation if a rate of success in remedying one or more read operation failures by a prioritized error control operation is below a threshold success rate.

Advantages of the present disclosure include, but are not limited to, an improved performance of the memory sub-system as the read operation can be successfully performed in less time. For example, if a failure occurs during the performance of a read operation, one or more prioritized error control operations can be executed before non-prioritized error control operations. Since the one or more prioritized error control operations have a higher rate of success in remedying prior read operation failures than non-prioritized error control operations, there is a higher likelihood that the read operation failure will be remedied by the one or more prioritized error control operations. Thus, by executing a prioritized error control operation to remedy the read operation failure, the read operation can be successfully performed in less time than if only non-prioritized error control operations were executed to remedy the read operation failure. As such, since a read operation can be performed in less time, the read latency of the memory sub-system can be decreased. The decreasing of the read latency can result in the memory sub-system being capable of satisfying Quality of Service (QoS) requirements that specify various operating requirements when performing the read operations at the memory sub-system.

FIG. 1 illustrates an example computing environment 100 that includes a memory sub-system 110 in accordance with some embodiments of the present disclosure. The memory sub-system 110 can include media, such as memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical magnetic, etc. Examples of a physical host interface include, but are not limited to, a serial advanced technology attachment (SATA) interface, a peripheral component interconnect express (PCIe) interface, universal serial bus (USB) interface, Fibre Channel (FC), Serial Attached SCSI (SAS), etc. The physical host interface can be used to transmit data between the host system 120 and the memory sub-system 110. The host system 120 can further utilize a NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes an error control component 113 that can be used to perform error handling of failed memory operations of the memory sub-system 110. In some embodiments, the memory sub-system controller 115 includes at least a portion of the error control component 113. For example, the memory sub-system controller 115 can include a processor 117 (processing device) configured to execute instructions stored in local memory 119 for performing the operations described herein. In some embodiments, the error control component 113 is part of the host system 120, an application, or an operating system.

The error control component 113 can receive an indication that an operation to access memory components 112A to 112N of the memory sub-system 110 has failed. The error control component 113 can execute an error control operation to attempt to remedy the failure of the memory access operation. Based on the success of the error control operation in remedying the failure of the memory access operation, the error control component 113 can either change an order of a performance of one or more prioritized error control operations for a subsequent failed memory access operation, or remove one or more prioritized error control operations from a group of prioritized error control operations. Further details with regards to the operations of the error control component 113 are described below.

Figure 2:
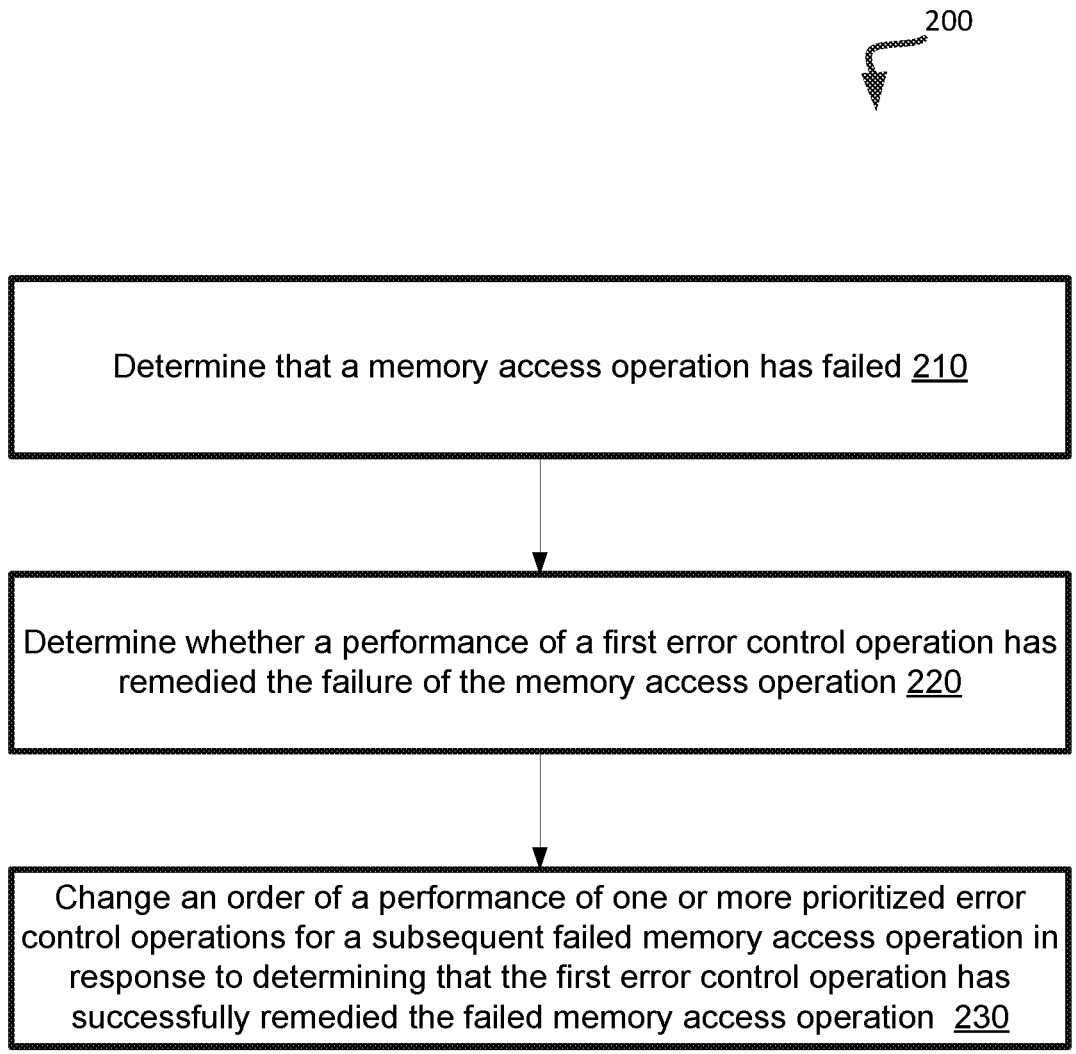
FIG. 2 is a flow diagram of an example method to perform error handling based on a failed memory access operation, in accordance with some embodiments of the present disclosure.

FIG. 2 is a flow diagram of an example method 200 to perform error handling based on a failed memory access operation, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the error control component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device determines that a memory access operation has failed. The memory access operation can be received from an application executing on the host system. In one embodiment, the memory access operation can be a read request. At operation 220, the processing device determines whether a performance of a first error control operation has remedied the failure of the memory access operation. An error control operation can include error detection and error correction. For example, the error control operation can be performed for data that has been retrieved from the memory sub-system. In some embodiments, the error control operation can detect any errors from the retrieved data (e.g., as a result of noise or other such impairments) that can result in one or more values of bits of the data to be changed from a '0' to a '1' (or vice versa) when the data is read from the memory sub-system. The error control operation can subsequently correct the values of the bits of the data that have been changed. The error control operation can be capable of correcting a certain number of bits of the retrieved data. If the error control operation is capable of correcting all of the detected errors in the retrieved data, then the error control operation can be considered to remedy the failure of the memory access operation that has requested the data. Otherwise, if the error control operation is not capable of correction all of the detected errors in the retrieved data (e.g., there are more bits with errors than the error control operation can correct), then the error control operation can be considered to not remedy the failure of the memory access operation. The processing device can identify the first error control operation from a selection of available error control operations. The first error control operation can include at least one of a static offset operation (i.e., applying different read voltages at the memory component to retrieve data), an auto calibration operation (i.e., an operation to determine an optimal read voltage by applying different read voltages at the memory component to retrieve data), a hard decoding operation (i.e., decoding a row and/or column of user data by receiving a binary channel output for each bit in a code word), a one-bit soft decoding operation (i.e., identify one or more low confidence and high confidence bits and estimate the data based on the identified bits), a multi-bit soft decoding operation, or a redundant array of independent NAND (RAIN) operation (i.e., a data protection scheme for generating and writing exclusive-or (XOR) data to media). The processing device can combine two or more of the above identified error control operations from the selection of error control operations as the first error control operation. The processing device can determine whether the first error control operation has remedied the failure of the memory access operation by executing the first error control operation and detecting whether the first error control operation successfully remedied the failure. If the processing device detects that the first error control operation did not successfully remedy the failure, the processing device can identify a second error control operation, execute the second error control operation, and detect whether the second error control operation has successfully remedied the failure.

At operation 230, the processing device, in response to detecting that the first error control operation successfully remedied the failed memory access operation, changes an order of performance of one or more prioritized error control operations for a subsequent failed memory access operation. For example, the order of a set of prioritized error control operations can be changed. Each prioritized error control operation of the set of prioritized error control operations can include an available error control operation that has successfully remedied at least one prior memory access operation failure. Each prioritized error control operation can be added to the set of prioritized error control operations in the order in which the prioritized error control operation successfully remedied a prior memory access operation failure. For example, at initialization of the memory sub-system, the set of prioritized error control operations can be empty. While the memory sub-system operates and as memory access operation failures occur, the processing device can execute one or more available error control operations to remedy the memory access operation failures. As the available error control operations successfully remedy the memory access operation failures, the successful error control operations can be added to the set of prioritized error control operations. Upon subsequent memory access operation failures, the processing device can first execute the prioritized error control operations before executing a non-prioritized error control operations. In one embodiment, the first error control operation can be a prioritized error control operation prior to the first error control operation successfully remedying the memory access operation of operation 210.

In some implementations, the set of prioritized error control operations can be included in a prioritized error control data structure, such as a list or a table. The prioritized error control data structure can contain a certain number of entries where each entry is associated with one prioritized error control operation. Because the prioritized error control data structure can contain a certain number of entries, when all entries are filled, the processing device cannot add additional error control entries to the prioritized error control data structure, unless an entry is removed, in accordance with embodiments of the present disclosure. In some embodiments, changing an order of performance of one or more prioritized error control operations included in a prioritized error control data structure can include re-ordering the entries of the prioritized error control data structure.

In some implementations, each prioritized error control operation of the set of prioritized error control operations can be associated with a success metric that indicates a rate of success of the respective prioritized error control operation to remedy at least one prior memory access operation failure. The success metric of each prioritized error control operation can be higher than a success metric associated with other available error control operations. The processing device can change the order of performance of the set of prioritized error control operations based on the success metric for each error control operation. For example, the processing device can change the order of performance of the set of prioritized error control operations by determining whether a success metric of the first error control operation is higher than a success metric of a prioritized error control operation of the set of prioritized error control operations. If the success metric of the first error control operation is higher than the success metric of the prioritized error control operation, the processing device can indicate to perform the first error control operation before performing the prioritized error control operation for a subsequent failed memory access operation. In one embodiment, the processing device can indicate to perform the first error control operation before performing the prioritized error control operation for a subsequent failed memory access operation by changing the order of entries of a prioritized error control data structure.

As discussed above, the processing device can change the order of performance of one or more prioritized error control operations of the set of prioritized error control operations. In other embodiments, the processing device can change the order of performance of each prioritized error control operation such that the prioritized error control operations associated with the highest success metrics can be performed before other prioritized error control operations to remedy subsequent memory access operation failures.

In certain implementations, the processing device can change the order of the performance of the prioritized error control operations based on a latency (i.e., the response time of a memory access operation request) of each prioritized error control operation. In some embodiments, the latency can be based on the amount of time to complete the performance of a particular error control operation. For example, the processing device can determine that a first success metric of a first prioritized error control operation corresponds with (e.g., is equal or is similar to) a second success metric of a second prioritized error control operation. Responsive to determining that a first latency of the first prioritized error control operation is lower than a second latency of the second prioritized error control operation, the processing device can then indicate to perform the first prioritized error control operation before performing the second prioritized error control operation for a subsequent failed memory access operation.

Figure 3A:
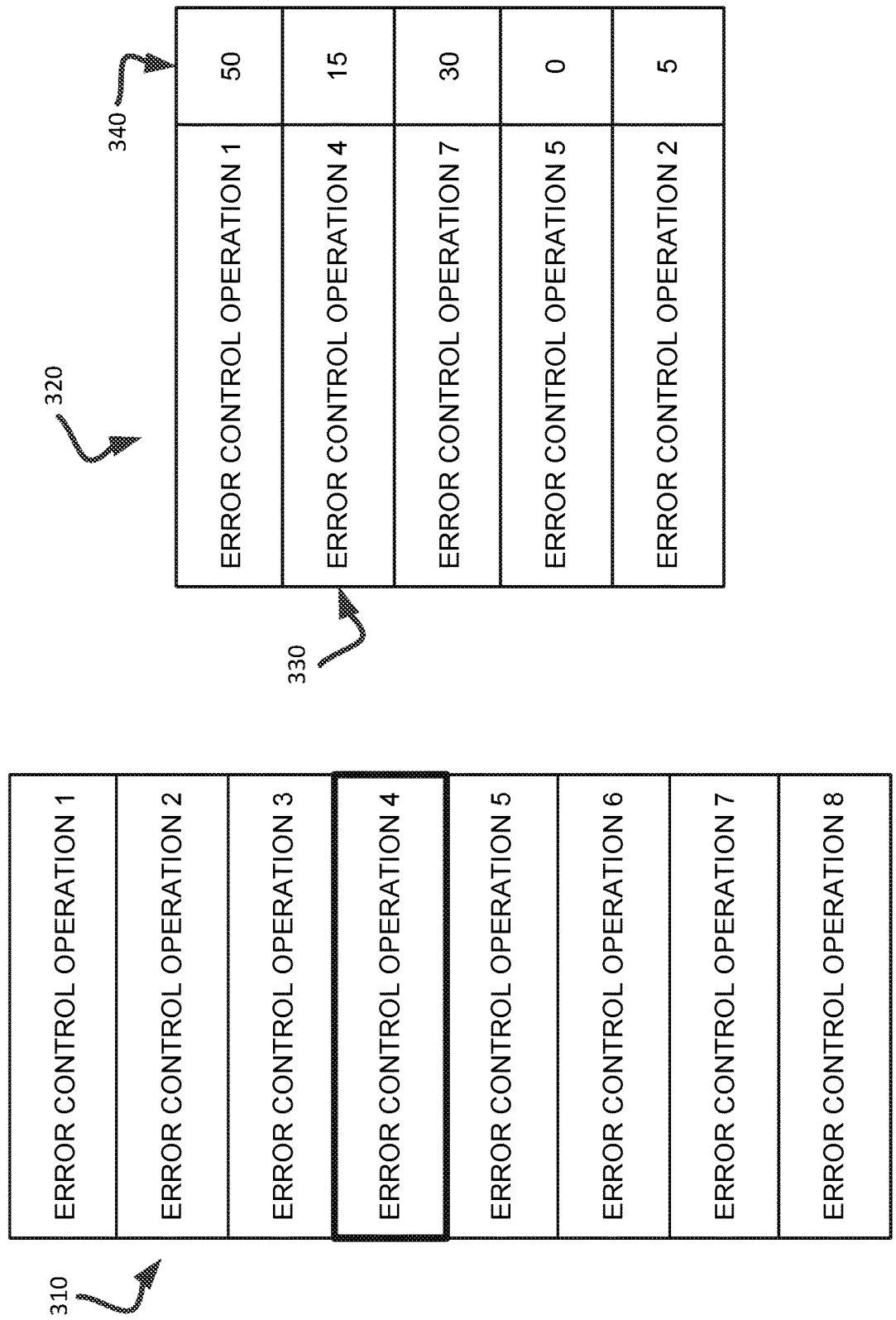
FIG. 3A illustrates an example set of pre-determined error control operations and an example set of prioritized error control operations, in accordance with some embodiments of the present disclosure.

FIG. 3A illustrates an example selection of available error control operations 310 and an example set of prioritized error control operations 320, in accordance with some embodiments of the present disclosure. The prioritized error control operations 330 of the set of prioritized error control operations 320 can be error control operations of the selection of available error control operations that successfully remedied at least one failed memory access operation. The prioritized error control operations 330 can be identified by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the prioritization of an error control operation from the selection of available error control operations 310 is performed by the error control component 113 of FIG. 1.

As shown in FIG. 3A, the selection of available error control operations 310 can specify various error control operations that can be performed at a memory sub-system. Eight available error control operations are illustrated, but any number of available error control operations 310 can be included in the memory sub-system. The selection of available error control operations 310 can include at least one of a static offset operation, an auto calibration operation, a hard decoding operation, a one-bit soft decoding operation, a multi-bit soft decoding operation, a RAIN operation, or any other type of operation that can be used to facilitate error detection and correction. Upon determining that a memory access operation has failed, the processing device can determine whether a performance of a first error control operation has remedied the failure by selecting and executing an available error control operation from the selection of available error control operations 310. For example, the processing device can select error control operation 4 from the selection of available error control operations 310 to remedy the memory access failure. The processing device can determine whether error control operation 4 successfully remedied the failure by executing error control operation 4 and detecting whether error control operation 4 successfully remedied the memory access failure (e.g., all detected errors were successfully corrected).

As discussed previously, upon determining that the first error control operation successfully remedied the failed memory access operation, the processing device changes an order of performance of one or more prioritized error control operations 330 of the set of prioritized error control operations 320. The set of prioritized error control operations 320 can include one or more error control operations that have successfully remedied at least one prior memory access operation failure. The set of prioritized error control operations 320 can further include an ordering of performance of the one or more error control operations 330 to be executed to remedy subsequent memory access operation failures. For example, the error control operation 1 can be performed to attempt to remedy a failed memory access operation prior to attempting to perform error control operation 4 to remedy the failed memory access operation. In one embodiment, the first error control operation can be a prioritized error control operation 330 prior to the first error control operation successfully remedying the failed memory access operation. For example, error control operation 4 can be a prioritized error control operation 330 of the set of prioritized error control operations 320 prior to the failure of the memory access operation.

Each prioritized error control operation 330 of the set of prioritized error control operations 320 can be associated with a success metric 340. The success metric 340 can indicate a rate of success of each prioritized error control operation to remedy at least one prior memory access operation failure. The processing device can change the order of performance of the set of prioritized error control operations 320 by determining whether a success metric of the first error control operation is higher than a success metric of a prioritized error control operation of the set of prioritized error control operations 320, discussed with respect to FIG. 3B below.

FIG. 3B illustrates a changing of an order of performance of an example set of prioritized error control operations 320, in accordance with some embodiments of the present disclosure. As discussed above, the processing device changes an order of performance of one or more prioritized error control operations 330 of a set of prioritized error control operations 320 upon determining that the first error control operation successfully remedied the failed memory access operation. The processing device can change the order of performance of the set of prioritized error control operations 320 based on a success metric 340 associated with each prioritized error control operation 330. For example, the processing device can determine that the success metric 340 associated with error control operation 7 is higher than the success metric 340 associated with error control operation 4. The processing device can also determine that error control operation 4 has a higher ordering in the set of prioritized error control operations 320 than error control operation 7 (e.g., error control operation 4 can be executed before error control operation 7 is executed to remedy a subsequent memory access operation failure). Upon determining that the success metric 340 associated with error control operation 7 is higher than the success metric 340 associated with error control operation 4, the processing device can change the ordering of the set of prioritized error control operations 320 such that error control operation 7 has a higher ordering in the set of prioritized error control operations 320 than error control operation 4. For example, error control operation 7 can be executed before error control operation 4 is executed to remedy a subsequent memory access operation failure.

In some embodiments, the processing device can periodically change the order of performance of prioritized error correction operations 330 of the set of error control operations. The processing device can determine that a number of memory access operations satisfies a threshold number of memory access operations. For example, the processing device can determine that one million memory access operations have occurred, which can satisfy the threshold number of memory access operations. The threshold number of memory access operations can be satisfied when the number of memory access operations that have been performed by the memory sub-system is equal to or exceeds the threshold number of memory access operations. Upon determining that the number of memory access operations satisfies the threshold number of memory access operations, the processing device can change the order of performance for each prioritized error correction operation 330 of the set of prioritized error control operations 320 such that the prioritized error control operations with the highest success metrics are performed first.

Figure 4:
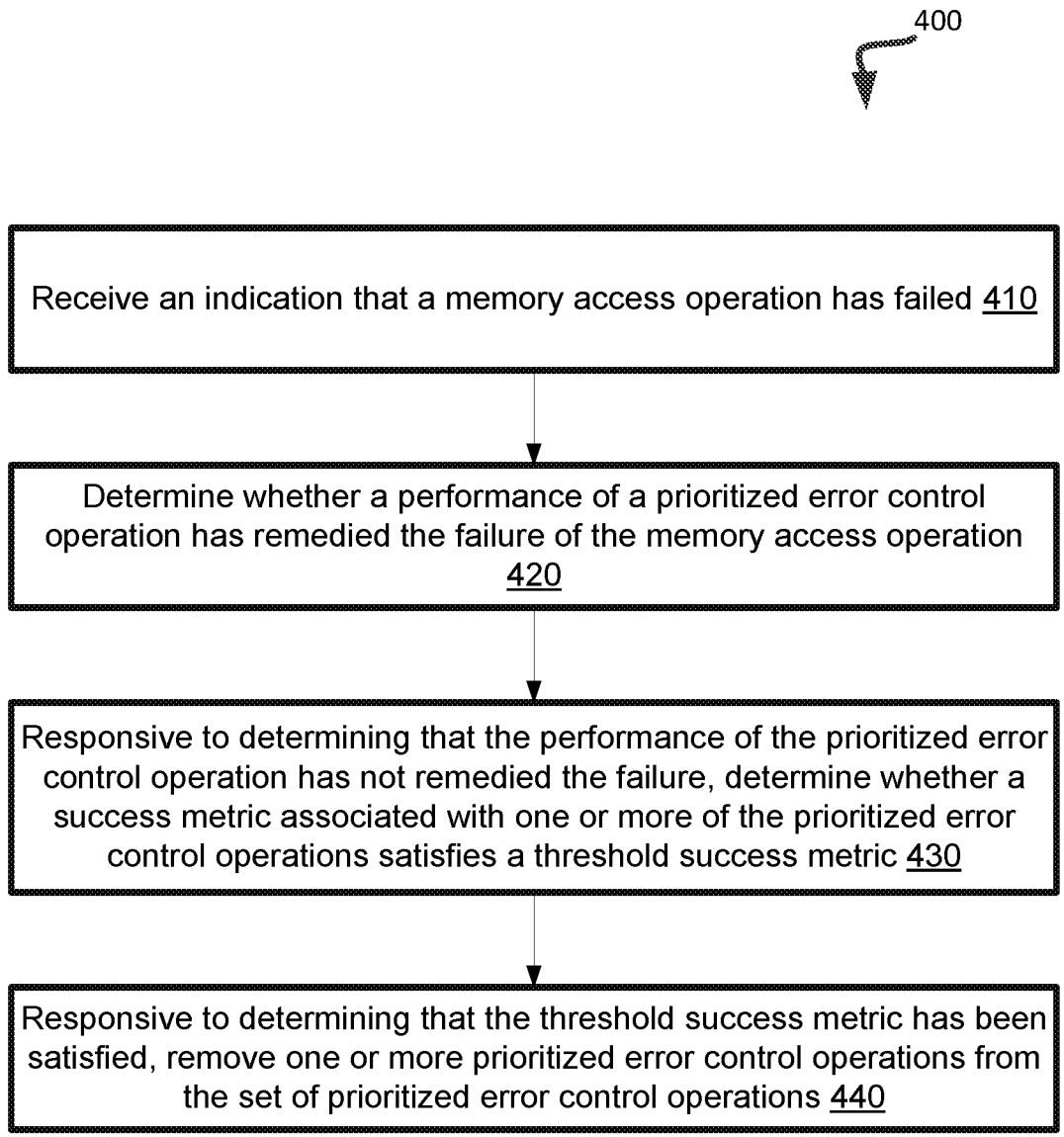
FIG. 4 is a flow diagram of an example method to perform error handling based on a failed memory access operation, in accordance with some embodiments of the present disclosure.

FIG. 4 is a flow diagram of an example method 400 to perform error handling based on a failed memory access operation, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the error control component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device receives an indication that a memory access operation has failed. The indication can be received when the data retrieved for the memory access operation includes at least one error. The memory access operation can be received from an application executing on the host system. In one embodiment, the memory access operation can be a read request. At operation 420, the processing device determines whether a performance of a prioritized error control operation has remedied the failure of the memory access operation. The prioritized error control operation can be a prioritized error control operation of a set of prioritized error control operations including one or more error control operations that have successfully remedied at least one prior memory access operation failure.

At operation 430, the processing device, responsive to determining that the performance of the prioritized error control operation has not remedied the failure, determines whether a success metric associated with one or more of the prioritized error control operations satisfies a threshold success metric. In one embodiment, the success metric can indicate a rate of success of each prioritized error control operation to remedy a failure of at least one prior memory access operation. In another embodiment, the success metric can indicate a rate of success to remedy a failure of at least one memory access operation by any prioritized error control operation of the set of prioritized error control operations. A prioritized error control operation can be considered to satisfy the threshold success metric when the rate of success to remedy a failure is equal to or exceeds a threshold success rate.

At operation 440, the processing device, responsive to determining that the threshold success metric has been satisfied, removes one or more prioritized error control operations from the set of prioritized error control operations. In one embodiment, the success metric can indicate a rate of success of each prioritized error control operation to remedy a failure of at least one prior memory access operation. The processing device can determine that a success metric associated with a certain prioritized error control operation satisfies the threshold success metric (e.g., the success metric is below the threshold success metric). Upon determining that the threshold metric has been satisfied, the processing device can remove the prioritized error control operation from the set of prioritized error control operations.

In another embodiment, the success metric can indicate a rate of success to remedy a failure of at least one memory access operation by any prioritized error control operation of the set of prioritized error control operations. The processing device can determine that the success metric associated with the set of prioritized error control operations satisfies the threshold success metric (e.g., the success metric is below the threshold success metric). Upon determining that the threshold metric has been satisfied, the processing device can remove each prioritized error control operation from the set of prioritized error control operations.

In certain implementations, the processing device can remove one or more prioritized error control operations from the set of prioritized error control operations associated with a lower rate of success. In one embodiment, the processing device can determine that a number of memory access operations satisfies a threshold number of memory access operations. Upon determining that the number of memory access operations satisfies a threshold number of memory access operations, the processing device can remove one or more prioritized error control operations from the set of prioritized error control operations. The processing device can identify the one or more prioritized error control operations to remove from the set of error control operations by identifying one or more error control operations associated with the lowest success metrics (i.e., the lowest rate of successfully remedying at least one memory access operation failure).

In some embodiments, the processing device can identify one or more prioritized error control operations to remove from the set of error control operations, where the success metric associated with the identified prioritized error control operations are approximately equal. In such embodiments, the processing device can remove one or more prioritized error control operations from the set of prioritized error control operations further based on a latency of the one or more prioritized error control operations. For example, the processing device can determine that a first success metric of a first prioritized error control operation corresponds with (e.g., is equal to) a second success metric of a second prioritized error control operation. The processing device can determine that a first latency of the first prioritized error control operation is lower than a second latency of the second prioritized error control operation. The processing device can then remove the second prioritized error control operation from the set of prioritized error control operations because the second prioritized error control operation is associated with a higher latency than the first prioritized error control operation.

Figures 5A, 5B:
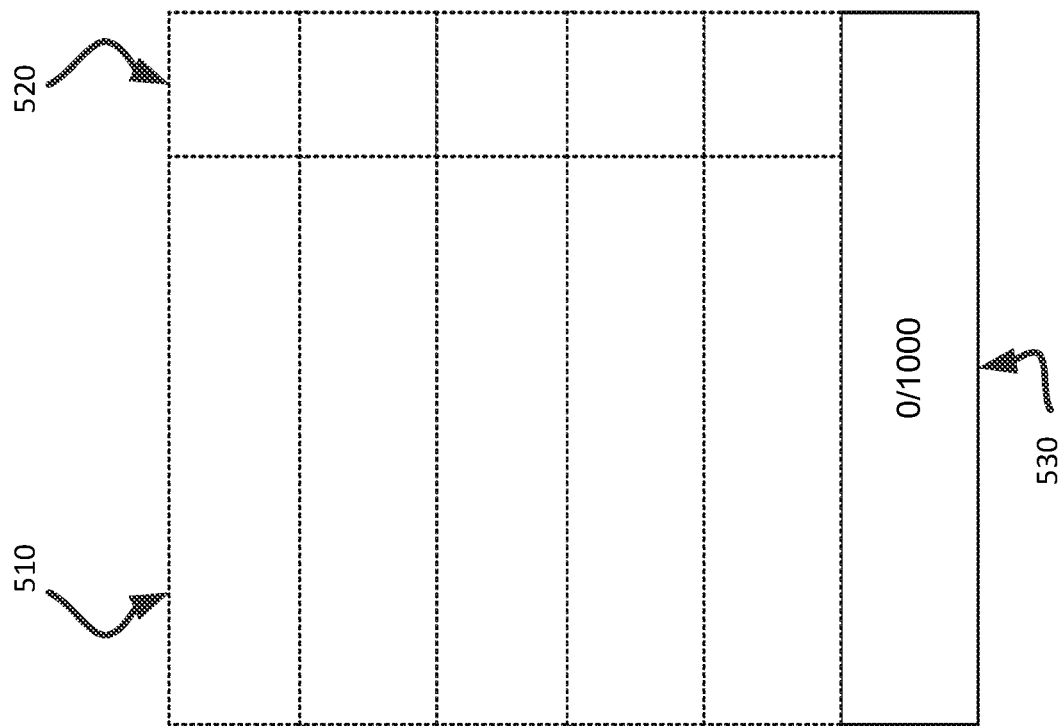
FIG. 5A illustrates an example set of prioritized error control operations, in accordance with some embodiments of the present disclosure.
FIG. 5B illustrates a resetting of an example set of prioritized error control operations, in accordance with some embodiments of the present disclosure.

FIG. 5A illustrates an example set of prioritized error control operations 510, in accordance with some embodiment of the present disclosure. The set of prioritized error control operations 510 can correspond with the set of prioritized error control operations 320 of FIGS. 3A and 3B. Similarly, a success metric 520 associated with each prioritized error control operation of the set of prioritized error control operations 510 can correspond with the success metric 340 associated with each prioritized error control operation of the set of error control operations 320. An overall success metric 530 can be further associated with the set of prioritized error control operations 510. The overall success metric 530 can indicate a rate of success to remedy a failure of at least one memory operation by any prioritized error control operation of the set of prioritized error control operations 510. For example, the overall success metric 530 can be incremented when a prioritized error control operation of the set of prioritized error control operations 510 successfully remedies a memory access operation failure.

FIG. 5B illustrates a resetting of an example set of prioritized error control operations 510, in accordance with some embodiments of the present disclosure. In one embodiment, the processing device can determine that the overall success metric 530 is below a threshold success metric. For example, the overall success metric 530 can be below a threshold success metric when the overall success metric 530 is approximately zero (e.g., no prioritized error control operation of the set of prioritized error control operations 510 has successfully remedied a threshold number of failed memory access operations). Upon determining that the overall success metric 530 is below a threshold success metric, the processing device can remove each prioritized error control operation from the set of prioritized error control operations 510. After each prioritized error control operation from the set of prioritized error control operations 510 has been removed, the processing device can add an available error control operation to the set of prioritized error control operations 510 upon determining that the available error control operation successfully remedied a failed memory access operation.

FIG. 5C illustrates a removing of a prioritized error control operation from an example set of prioritized error control operations 510, in accordance with some embodiments of the present disclosure. In one embodiment, the processing device can determine that a success metric 520 associated with a prioritized error control operation of the set of prioritized error control operations 510 is below a threshold and remove the prioritized error control operation from the set of prioritized error control operations 510. For example, the processing device can determine that error control operation 5 of the set of prioritized error control operations 510, illustrated in FIG. 5A, is associated with a success metric 520 that is below a threshold. The processing device can remove error control operation 5 from the set of prioritized error control operations 510. By removing the prioritized error control operation from the set of prioritized error control operations 510, the processing device can add an available error control operation to the set of prioritized error control operations 510 upon determining that the available error control operation has successfully remedied a failed memory access operation. FIG. 5D illustrates a removing of a prioritized error control operation and a changing of an order of performance of an example set of prioritized error control operations 510, in accordance with some embodiments of the present disclosure. In one embodiment, upon removing a prioritized error control operation from the set of prioritized error control operations 510, the processing device can change an order of performance of one or more prioritized error control operations, in accordance with embodiments previously disclosed.

Figure 5E:
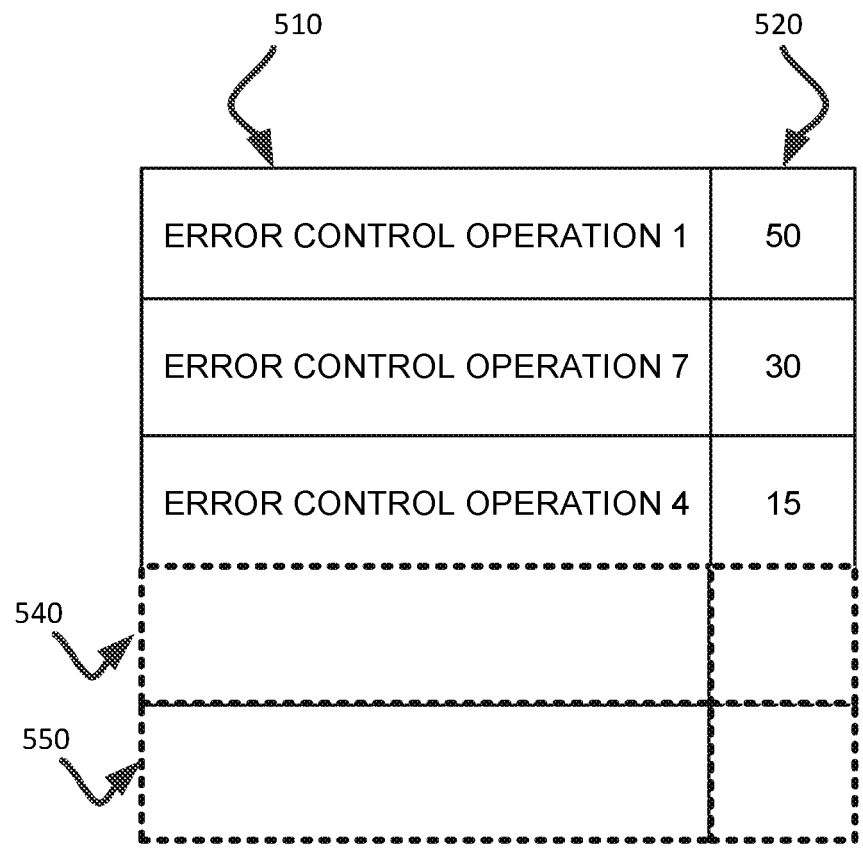
FIG. 5E illustrates a removing of one or more prioritized error control operations associated with a low rate of success from an example set of prioritized error control operations, in accordance with some embodiments of the present disclosure.

FIG. 5E illustrates a removing of one or more prioritized error control operations associated with a lower rate of success from an example set of prioritized error control operations 510, in accordance with some embodiments of the present disclosure. In one embodiment, the processing device can determine that a number of memory access operations satisfies a threshold number of memory access operations. Upon determining that the number of memory access operations satisfies a threshold number of memory access operations, the processing device can remove one or more prioritized error control operations from the set of prioritized error control operations 510. The processing device can identify the one or more prioritized error control operations to remove from the set of prioritized error control operations 510 by identifying the one or more prioritized error control operations associated with the lowest success metrics 520. For example, the processing device can determine to remove two prioritized error control operations from the set of prioritized error control operations 510. The processing device can determine to remove error control operation 5 and error control operation 2 from the set of prioritized error control operations 510, illustrated in FIG. 5A, because both error control operation 5 and error control operation 2 are associated with success metrics 520 that are lower than the success metrics 520 associated with other error control operations (e.g., error control operation 1, error control operation 4, and error control operation 7). In one embodiment, upon removing error control operation 5 and error control operation 2 from the set of prioritized error control operations 510, the processing device can add an available error control operation to the set of prioritized error control operations 510 upon determining the available error control operation successfully remedied a failed memory access operation.

Figure 6:
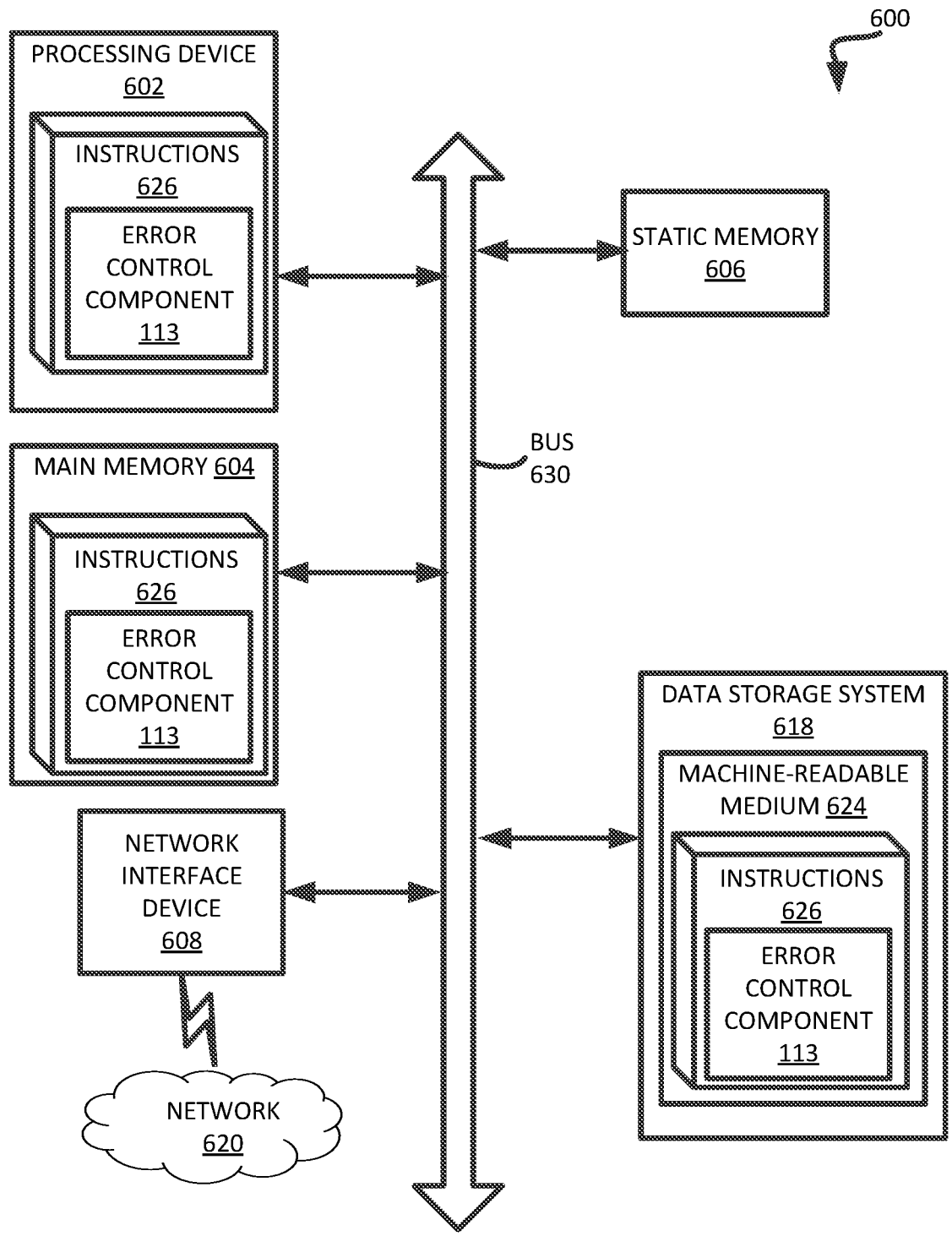
FIG. 6 is a block diagram of an example computer system in which implementations of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the error control component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an error control component (e.g., the error control component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component; and
a processing device, operatively coupled with the memory component to:
determine that a memory access operation has failed;
determine whether a performance of a first error control operation has remedied the failure of the memory access operation; and
responsive to determining that the first error control operation has remedied the failure of the memory access operation, changing an order of a performance of one or more prioritized error control operations of a plurality of prioritized error control operations for a subsequent memory access operation that has failed based on the first error control operation that has remedied the failure.

2. The system of claim 1, wherein each of the plurality of prioritized error control operations is associated with a success metric, wherein the success metric indicates a rate of success of each of the plurality of prioritized error control operations to remedy a failure of at least one prior memory access operation, and wherein to change the order of the performance of the one or more of the prioritized error control operations, the processing device is further to:
determine whether a first success metric of the first error control operation is higher than a second success metric of a second error control operation of the plurality of prioritized error control operations; and
in response to determining that the first success metric is higher than the second success metric, indicate to perform the first error control operation before performing the second error control operation for the subsequent memory access operation that has failed.

3. The system of claim 1, wherein the plurality of prioritized error control operations comprises particular error control operations with a higher success rate than other error control operations.

4. The system of claim 1, wherein the changing of the order of the performance of the one or more prioritized error control operations is further based on a latency of each of the one or more prioritized error control operations.

5. The system of claim 4, wherein to change the order of the performance of the one or more prioritized error control operations, the processing device is further to:
determine that a first success metric of a first prioritized error control operation corresponds to a second success metric of a second prioritized error control operation;
determine that a first latency of the first prioritized error control operation is lower than a second latency of the second prioritized error control operation; and responsive to determining that the first success metric corresponds to the second success metric and that the first latency is lower than the second latency, indicate to perform the first prioritized error control operation before performing the second prioritized error control operation for the subsequent memory access operation that has failed.

6. The system of claim 1, wherein the processing device is further to:
determine that a threshold number of memory access operations has been satisfied, wherein the changing of the order of the performance of the one or more prioritized error control operations is further based on determining that the threshold number of memory access operations has been satisfied.

7. The system of claim 1, wherein the plurality of prioritized error control operations comprises a plurality of different read voltages that are applied at the memory component to retrieve data and a plurality of decoding operations.

8. A method comprising:
receiving an indication that a memory access operation has failed;
determining whether a performance of a prioritized error control operation of a plurality of prioritized error control operations has remedied the failure of the memory access operation;
responsive to determining that the performance of the prioritized error control operation has not remedied the failure, determining, by a processing device, whether a success metric associated with one or more of the prioritized error control operations satisfies a threshold success metric; and
responsive to determining that the threshold success metric has been satisfied, removing the one or more prioritized error control operations from the plurality of prioritized error control operations.

9. The method of claim 8, wherein the threshold success metric corresponds to a rate of success to remedy a failure of at least one memory access operation by the prioritized error control operation, and wherein removing one or more prioritized error control operations from the plurality of prioritized error control operations comprises:
removing the prioritized error control operation from the plurality of prioritized error control operations when the success metric associated with the prioritized error control operation is below the threshold success metric.

10. The method of claim 8, wherein the threshold success metric corresponds to a rate of success to remedy a failure of at least one memory access operation by any prioritized error control operation of the plurality of prioritized error control operations, and wherein removing one or more prioritized error control operations from the plurality of prioritized error control operations comprises:
removing each prioritized error control operation from the plurality of prioritized error control operations when the success metric is below the threshold success metric.

11. The method of claim 8, further comprising:
determining that a number of memory access operations satisfies a threshold number of memory access operations; and
in response to determining that the number of memory access operations satisfies the threshold number of memory access operations, removing one or more prioritized error control operations from the plurality of prioritized error control operations, wherein a success rate metric associated with each removed prioritized error control operation is lower than a success rate metric associated with each remaining prioritized error control operation of the plurality of prioritized error control operations.

12. The method of claim 11, wherein removing one or more prioritized error control operations from the plurality of prioritized error control operations further comprises:
determining that a first success metric of a first prioritized error control operation corresponds to a second success metric of a second prioritized error control operation;
determining that the first success metric and the second success metric are lower than a success rate metric associated with one or more prioritized error control operations of the plurality of prioritized error control operations;
determining that a first latency of the first prioritized error control operation is lower than a second latency of the second prioritized error control operation; and
responsive to determining that the first success metric corresponds to the second success metric, the first success metric and the second success metric are lower than the success rate metric associated with one or more prioritized error control operations, and that the first latency is lower than the second latency, removing the first prioritized error control operation from the plurality of prioritized error control operations.

13. The method of claim 8, wherein the plurality of prioritized error control operations comprises a plurality of different read voltages that are applied at a memory component to retrieve data and a plurality of decoding operations.

14. A non-transitory computer-readable medium comprising instructions, which when executed by a processing device, cause the processing device to:
determine that a memory access operation has failed;
determine whether a performance of a first error control operation has remedied the failure of the memory access operation; and
responsive to determining that the first error control operation has remedied the failure of the memory access operation, change an order of a performance of one or more prioritized error control operations of a plurality of prioritized error control operations for a subsequent memory access operation that has failed based on the first error control operation that has remedied the failure.

15. The non-transitory computer-readable medium of claim 14, wherein each of the plurality of prioritized error control operations is associated with a success metric, wherein the success metric indicates a rate of success of each of the plurality of prioritized error control operations to remedy a failure of at least one prior memory access operation, and wherein to change the order of the performance of the one or more of the prioritized error control operations, the processing device is further to:
determine a first success metric of the first error control operation is higher than a second success metric of a second error control operation of the plurality of prioritized error control operations; and
in response to determining that the first success metric is higher than the second success metric, indicate to perform the first error control operation before performing the second error control operation for a subsequent memory access operation that has failed.

16. The non-transitory computer-readable medium of claim 14, wherein the plurality of prioritized error control operations comprises particular error control operations with a higher success rate than other error control operations.

17. The non-transitory computer-readable medium of claim 14, wherein the changing of the order of the performance of the one or more prioritized error control operations is further based on a latency of each of the one or more prioritized error control operations.

18. The non-transitory computer-readable medium of claim 17, wherein to change the order of the performance of the one or more prioritized error control operations, the processing device is further to:
 determine a first success metric of a first prioritized error control operation corresponds to a second success metric of a second prioritized error control operation;
 determine that a first latency of the first prioritized error control operation is lower than a second latency of the second prioritized error control operation; and
 responsive to determining that the first success metric corresponds to the second success metric and that the first latency is lower than the second latency, indicate to perform the first prioritized error control operation before performing the second prioritized error control operation for the subsequent memory access operation that has failed.

19. The non-transitory computer-readable medium of claim 14, wherein the processing device is further to:
 determine that a threshold number of memory access operations has been satisfied, wherein the changing of the order of the performance of the one or more prioritized error control operations is further based on determining that the threshold number of memory access operations has been satisfied.

20. The non-transitory computer-readable medium of claim 14, wherein the plurality of prioritized error control operations comprises a plurality of different read voltages that are applied at a memory component to retrieve data and a plurality of decoding operations.

* * * * *